Patented Jan. 20, 1942

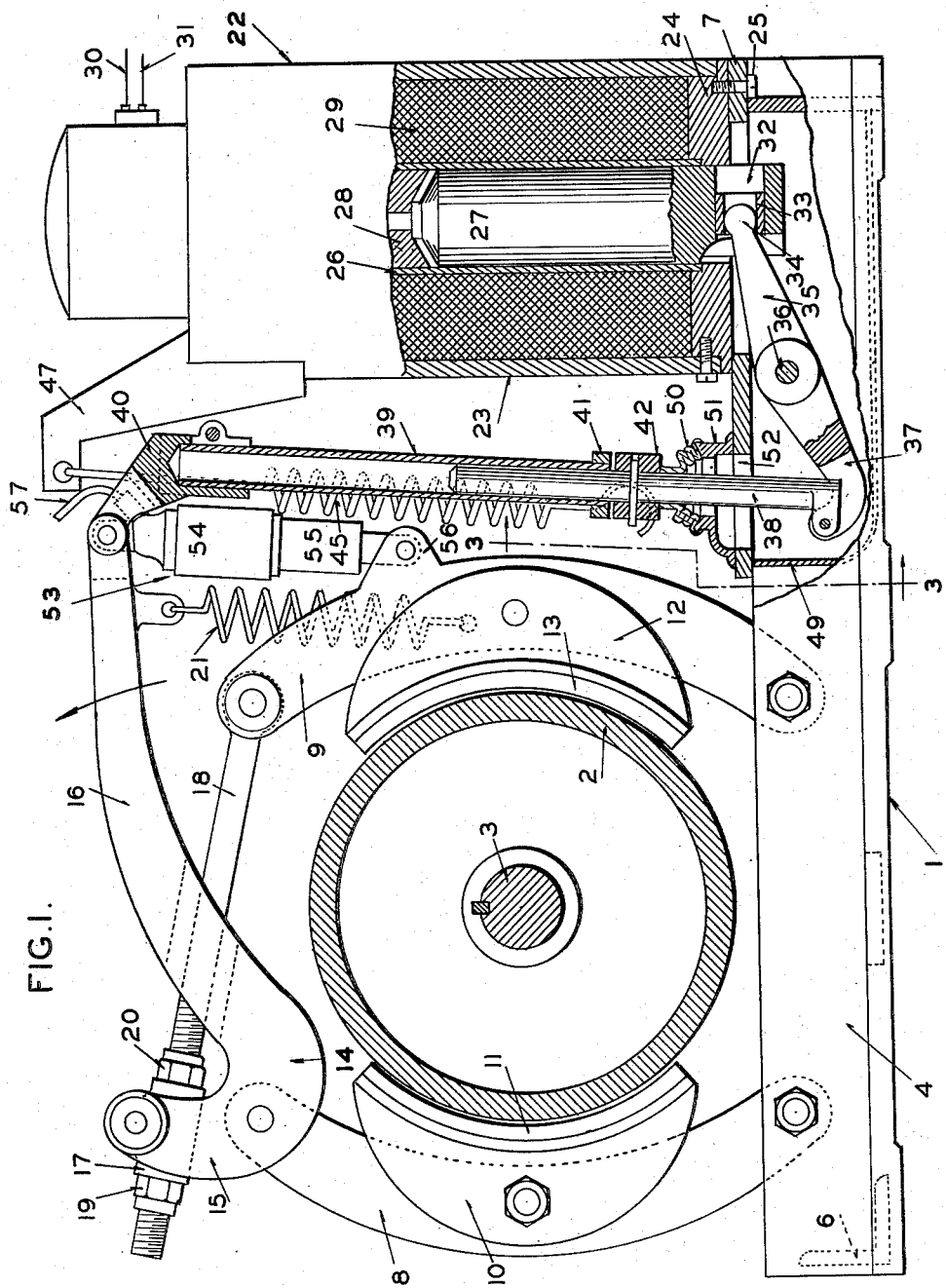

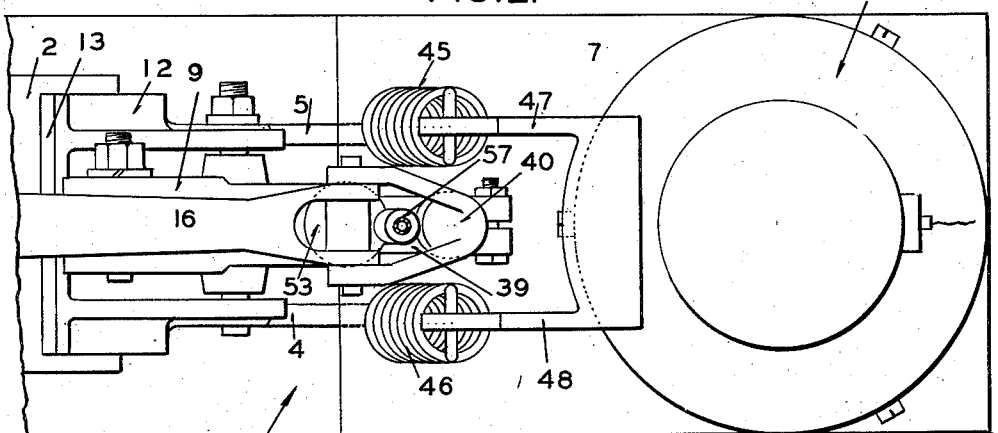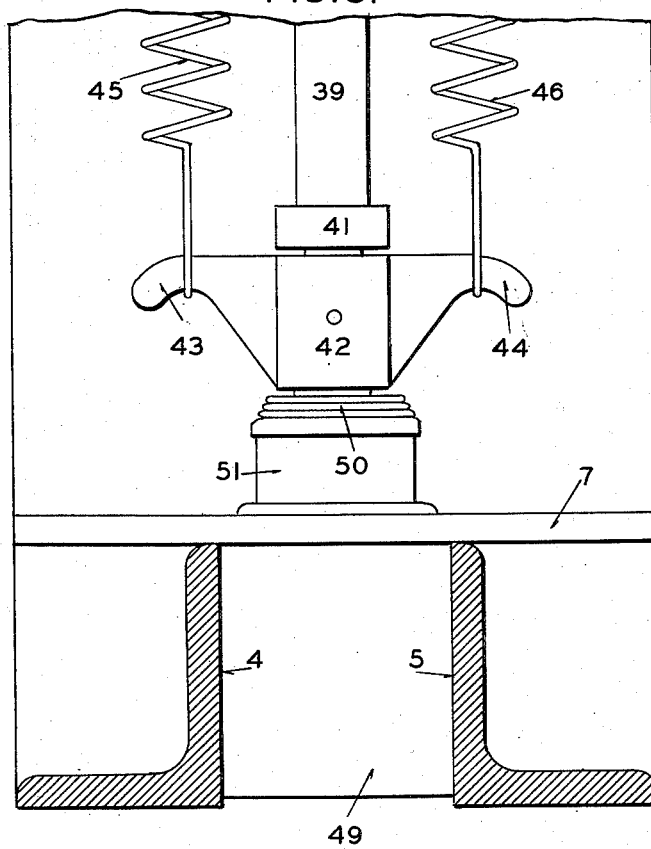

2,270,417

UNITED STATES PATENT OFFICE 2,270,417

SOLENOID-CONTROLLED BRAKE

John C. Cox, Clayton, Mo., assignor to Wagner Electric Corporation, St. Louis, Mo., a corporation of Delaware Application October 26, 1940, Serial No. 362,904

6 Claims. (Cl. 188—171)

My invention relates to brakes and more particularly to actuating means therefor.

One of the objects of my invention is to provide a solenoid-controlled actuating means for a brake.

Another and more specific object of my invention is to provide an external brake with a solenoid-controlled actuating means which is so constructed and arranged that the brake and the actuating means including the solenoid can be mounted on a single supporting base to form a compact unitary assembly.

Other objects of my invention will become apparent from the following description taken in connection with the accompanying drawings in which Figure 1 is a side view of a brake and actuating means embodying my invention, parts being shown in section; Figure 2 is a partial top view; and Figure 3 is a sectional view taken on the line 3—3 of Figure 1.

The brake and actuating means shown in the drawings is particularly adapted for industrial use but it may be employed to brake any rotatable member desired. The base 1 for the brake shoes and the actuating mechanism is positioned beneath the rotatable drum 2 secured to the shaft 3 to be braked. The base is constructed from two spaced apart angle irons 4 and 5 secured together at one end by an angle iron 6 and at its other end by a plate 7 attached to the top of the portion of the two angle irons which extend beyond the brake drum. Pivoted on the angle irons 3 and 4 of the base are arms 8 and 9 extending upwardly on opposite sides of the brake drum. The arm 8 has pivoted thereto a brake shoe 10 provided with a lining 11 for cooperation with the drum and the arm 9 has pivoted thereto a similar brake shoe 12 provided with a lining 13 for cooperation with the drum. The upper free end of arm 8 has pivotally mounted thereto a lever 14 having short upwardly extending arms 15 and a longer arm 16 extending across the brake. The two short arms 15 have pivoted thereto a sleeve 17 which receives one end of a rod 18, the other end being pivotally connected to the free upper end of arm 9. Nuts 19 and 20 threaded on the rod 18 secure said rod and sleeve 17 together and permit adjustment therebetween. It is thus seen that by the arrangement of the lever 14 and rod 18, the brake may be applied and released by movement of said lever. When the lever is moved upwardly, as indicated by the arrow, the arms 8 and 9 will be pulled toward each other and the brake shoes applied to the drum. When the lever is moved in the opposite direction, the brake shoes will be released from the drum. A spring 21 has one end connected to arm 16 and its other end to arm 9 and is of such strength as to bias the lever 14 to a position causing the brake shoes to be released from the drum.

On plate 7, secured to the top of the portion of the angle irons 4 and 5 extending beyond the brake drum, is mounted a solenoid, generally indicated by the numeral 22. This solenoid comprises a cylindrical casing 23 provided with an end closure member 24 which is secured by bolts 25 to plate 7. Within the cylindrical casing and concentric therewith is a tubular member 26 receiving the reciprocable armature or plunger 27 of the solenoid extending through the bottom of the closure member 24 and projecting into the space between the angle irons 4 and 5. At its upper end the tubular member 26 has mounted therein a fixed member 28 of magnetic material and against which the plunger 27 is adapted to abut when the coil is energized to cause the plunger to be pulled upwardly. The winding 29 of the solenoid is positioned between the tube 26 and the casing 23 and the terminals 30 and 31 are adapted to be connected to a source of current through suitable resistances and switches as is known practice.

The lower end of the plunger which projects into the space between the angle irons 4 and 5 is provided with a bore 32 in which is a bearing sleeve 33 for the ball-shaped end 34 of a lever 35, said lever being pivoted intermediate its ends on a pin 36 journaled in the angle irons 4 and 5. The other forked end 37 of this lever has pivotally connected thereto the lower end of an upright rod 38. This rod is slidably received in a tubular rod 39, the upper end of which has secured thereto a member 40 for pivotally connecting said tubular rod to the arm 16 of lever 14. The lower end of the tubular rod 39 carries a collar 41 for abutment by a collar 42 secured to an intermediate portion of the rod 38. Thus, when rod 38 is caused to be moved upwardly, it will also cause the tubular rod 39 to be moved upwardly and rotate the lever 14 in the direction indicated by the arrow.

The collar 42 is provided on opposite sides thereof with lugs 43 and 44 (Figure 3) to which are connected at their lower ends springs 45 and 46. The upper ends of these springs are connected to arms 47 and 48 secured to the top of casing 23 of the solenoid. These springs are normally under tension and provide the force for applying the brake. They are of considerably greater strength than the retracting spring 21 previously referred to. Thus, when the springs are free to operate, they will insure that the rods 38 and 39 will be pulled upwardly to thereby rotate the lever 16 in the direction of the arrow 5 and apply the brake with sufficient force to stop the rotatable member.

The lever 35 and the lower end of the plunger are enclosed by a casing member 49 to exclude dust and other foreign material, this casing member cooperating with the two sides of the angle irons 4 and 5 between which the lever 35 is positioned. A dust excluding boot 50 is also employed for cooperation with the rod 38 and a member 51 which fits around the enlarged opening 52 in plate 7 through which rod 38 extends.

When the solenoid is energized the brake is in released condition and the parts for actuating the brake are in the positions shown. The energization of the solenoid will hold plunger 27 in its upward position, thereby causing the lever 35 to pull rod 38 downwardly and stretch the springs 45 and 46. Since these springs can no longer act on the tubular rod 39 through the collars 42 and 41, the brake will be released by the retracting spring 21. The collar 42 in the released condition of the brake will be slightly spaced from collar 41 as shown. When it is desired to apply the brake, the solenoid is de-energized, thereby permitting springs 45 and 46 to pull rod 38 upwardly and cause collar 42 to move the tubular rod 39. The upward movement of rod 39 will swing lever 14 in the direction indicated by the arrow and thereby cause the arms 8 and 9 to be pulled toward each other and apply the brake shoes to the drum and stop its rotation.

In order that the brake may be applied by a fluid pressure system, there is also provided a fluid motor 53, the cylinder 54 of which is pivotally connected to the end of lever 16 and the piston 55 of which is pivotally connected to a lug 56 on an intermediate portion of the arm 9. The cylinder is connected by a conduit 57 to a suitable source of pressure. If it is desired to apply the brake by the fluid motor, fluid under pressure is transmitted through the conduit 57 to the cylinder and this fluid pressure will cause cylinder 54 and piston 55 to move in opposite directions, thereby turning lever 14 in the direction shown by the arrow and applying the brakes. When the fluid pressure is released, the retractile spring 21 will disengage the brake shoes.

From the foregoing description it is apparent that the brake and actuating means is very sturdy and compact. The brake shoes and the actuating means are all mounted on a single base, thus making the entire structure unitary. The solenoid is rigidly mounted on the base and when it is energized, the reaction forces are caused to be taken by the base. The lever 35 is pivoted to the angle irons of the base and the brake applying springs 45 and 46 which are stretched by lever 35 when actuated by the plunger of the solenoid are also connected to the base by means of the casing 23. The lever and rod arrangement permits the solenoid to be positioned to one side of the brake with its axis in a vertical position. With the brake shoes and the actuating means including the solenoid all mounted on a single base, all that is necessary to install the brake is to mount this base properly on a suitable support beneath the brake drum and then adjust the base so that the shoes will properly engage the drum.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking mechanism, a rotatable drum, brake shoes for engaging the drum, means for actuating the brake shoes comprising a lever extending to one side of the brake, a solenoid positioned adjacent the said one side of the brake and comprising an upright stationary winding and a plunger reciprocable therein, a lever pivoted adjacent the lower end of the solenoid and having one end connected to the plunger, an upright rod operatively connected at its upper end to the first named lever and at its lower end to the second named lever, a spring for causing the first named lever to apply the brakes, and a second and lighter spring for releasing the brakes, said solenoid when energized causing the plunger, the second named lever and the rod to prevent said first spring from holding the brakes applied and permitting the second spring to release the brakes.

2. In braking mechanism, a rotatable brake drum, a support below the drum and extending to one side thereof, arms positioned on opposite sides of the drum and each pivoted at one end to the support, friction means carried by the arms for engagement with the external surface of the drum, lever and linkage mechanism connected to the other ends of the arms for moving said arms toward each other and engaging the friction means with the drum, an upright solenoid mounted on the portion of the support adjacent the brake and having its plunger movable upwardly when the solenoid is energized, a lever pivoted to the support and operatively connected at one end to the plunger, an upright rod connecting the other end of the last named lever to the lever and linkage mechanism of the brake to thereby cause the lever and linkage mechanism to be moved when the rod is moved downwardly by upward movement of the plunger, and spring means operating on the lever and linkage mechanism to apply the brake, said brake being released by the energization of the solenoid and operation of the plunger.

3. In braking mechanism, a rotatable brake drum, a support below the drum and extending to one side thereof, arms positioned on opposite sides of the drum and each pivoted at its lower end to the support, friction means on the arms for cooperation with the drum, a lever pivoted intermediate its ends to the upper end of one arm, a link connecting one end of the lever to the upper end of the other arm, a solenoid mounted on the support adjacent the brake and having its plunger vertically reciprocable, a lever pivoted to the support and having one end operatively connected to the lower end of the plunger, telescoping upright rods, one of which is connected to the last named lever and the other of which is connected to the other end of said lever pivoted on one arm, means forming cooperating abutments on the telescoping rods, and a spring connected at one end to the lower telescoping rod and at its other end to the upper part of the stationary portion of the solenoid, said spring normally holding the abutments of the rods engaged and causing the first named lever to move the arms toward the drum and apply the brake and said solenoid when energized causing the spring to be tensioned by movement of the lower telescoping rod to thereby permit release of the brake.

4. A unitary assembly for association with a rotatable drum having an external shoe engaging surface, said assembly comprising a supporting base for positioning beneath the drum, brake shoes pivotally mounted on the base for cooperation with opposite sides of the drum, means associated with the brake shoes and comprising a lever for engaging the shoes with and disengaging them from the drum, a solenoid mounted on the support and having a reciprocable plunger, a spring connected at one end to the support, means connecting the other end of the spring to act on the lever to cause it to engage the brake shoes with the drum, means including a lever pivoted on the support and operated by the movement of the plunger when the solenoid is energized for acting on the spring only and causing it to be ineffective to apply the brake shoes, and a weaker spring connected to the first lever for releasing the brakes.

5. A unitary assembly for association with a rotatable drum having an external shoe engaging surface, said assembly comprising a supporting base for positioning beneath the drum, brake shoes pivotally mounted on the base for cooperation with opposite sides of the drum, means associated with the brake shoes and comprising a lever for engaging the shoes with and disengaging them from the drum, a solenoid mounted on the support adjacent and to one side of the brake shoes and having a reciprocable plunger, a strong spring, means for connecting the spring to the lever to cause the lever to engage the brake shoes, said means including means permitting the spring to be stretched without movement of the lever to brake released position, means connecting the plunger to the spring so that when the plunger is operated upon energization of the solenoid the spring will be caused to be ineffective to apply the brake shoes, and a second weaker spring for releasing the brakes when the first spring is caused to be ineffective.

6. A unitary assembly for association with a rotatable drum having an external shoe engaging surface, said assembly comprising a supporting base for positioning beneath the drum, brake shoes pivotally mounted on the base for cooperation with opposite sides of the drum, means associated with the brake shoe and comprising a lever for engaging the shoes with and disengaging them from the drum, a solenoid mounted on the support in an upright position at one side of the shoes and having a reciprocable plunger extending from the bottom thereof, a lever pivoted on the base adjacent the bottom of the solenoid and having one end connected with the plunger, means including an upright rod positioned between the brake and solenoid for connecting the other end of the last named lever to the first named lever, and a spring connected between the rod and the upper part of the solenoid and acting to cause the rod to move the first lever to a position engaging the brake shoes with the drum, said solenoid when energized causing the last named lever and rod to be moved to such a position as to prevent the spring from being effective on the first named lever to apply the brake shoes.

JOHN C. COX.